United States Patent
Tessler et al.

(10) Patent No.: US 12,505,599 B2
(45) Date of Patent: Dec. 23, 2025

(54) LEARNING DIRECTABLE VIRTUAL AGENTS THROUGH CONDITIONAL ADVERSARIAL LATENT MODELS

(71) Applicant: NVIDIA Corporation, Santa Clara, CA (US)

(72) Inventors: Chen Tessler, Tel Aviv (IL); Gal Chechik, Tel Aviv (IL); Yoni Kasten, Tel Aviv (IL); Shie Mannor, Tel Aviv (IL); Jason Peng, Vancouver (CA)

(73) Assignee: NVIDIA Corporation, Santa Clara, CA (US)

( * ) Notice: Subject to any disclaimer, the term of this patent is extended or adjusted under 35 U.S.C. 154(b) by 266 days.

(21) Appl. No.: 18/364,982

(22) Filed: Aug. 3, 2023

(65) Prior Publication Data

US 2024/0249458 A1  Jul. 25, 2024

Related U.S. Application Data

(60) Provisional application No. 63/481,265, filed on Jan. 24, 2023.

(51) Int. Cl.
*G06T 13/40* (2011.01)
*G06N 3/08* (2023.01)
*G06T 13/80* (2011.01)

(52) U.S. Cl.
CPC .......... *G06T 13/40* (2013.01); *G06N 3/08* (2013.01); *G06T 13/80* (2013.01)

(58) Field of Classification Search
CPC .......... G06T 13/40; G06T 13/80; G06N 3/08; G06N 3/006; G06N 3/045; G06N 3/047; G06N 3/084; G06N 3/088; G06N 7/01
See application file for complete search history.

(56) References Cited

U.S. PATENT DOCUMENTS

| 2012/0150650 A1* | 6/2012 | Zahand | G06Q 30/0251 705/14.66 |
| 2021/0338458 A1* | 11/2021 | Lenzi | A61F 2/60 |
| 2022/0108183 A1* | 4/2022 | Arpit | G06N 3/045 |

OTHER PUBLICATIONS

Learning Finite State machine controllers from motion capture data (Year: 2009).*
Adversarial learning for modeling human motion (Year: 2018).*

(Continued)

*Primary Examiner* — Xiao M Wu
*Assistant Examiner* — Latrell Anthony Creary (57) ABSTRACT

A conditional adversarial latent model (CALM) process can be used to generate reference motions from a set of original reference movements to create a library of new movements for an agent. The agent can be a virtual representation various types of characters, animals, or objects. The CALM process can receive a set of reference movements and a requested movement. An encoder can be used to map the requested movement onto a latent space. A low-level policy can be employed to produce a series of latent space joint movements for the agent. A conditional discriminator can be used to provide feedback to the low-level policy to produce stationary distributions over the states of the agent. A high-level policy can be employed to provide a macro movement control over the low-level policy movements, such as providing direction in the environment. The high-level policy can utilize a reward or a finite-state machine function.

25 Claims, 7 Drawing Sheets

(56) References Cited

OTHER PUBLICATIONS

Peng, et al.; "ASE: Large-Scale Reusable Adversarial Skill Embeddings for Physically Simulated Characters"; ACM Trans. Graph.; vol. 41, No. 4, Article 94; Jul. 2022; 18 pgs.
Torabi, et al.; "Generative Adversarial Imitation from Observation"; Appearing in the Proceedings of the ICML Workshop on Imitation, Intent, and Interaction (13), Long Beach, California; 2019; 10 pgs.
Radford, et al.; "Learning Transferable Visual Models From Natural Language Supervision"; ArXiv. abs/2103.00020; 2021; 48 pgs.
Tevet, et al; "MotionCLIP: Exposing Human Motion Generation to CLIP Space"; ArXiv. /abs/2203.08063; 2022; 10 pgs.
Juravsky, et al.; "PADL: Language-Directed Physics-Based Character Control"; SA '22 Conference Papers, Dec. 6-9, 2022, Daegu, Republic of Korea; Association for Computing Machinery; 9 pgs.

\* cited by examiner

LEARNING DIRECTABLE VIRTUAL AGENTS THROUGH CONDITIONAL ADVERSARIAL LATENT MODELS

CROSS-REFERENCE TO RELATED APPLICATION

This application claims the benefit of U.S. Provisional Application Ser. No. 63/481,265 filed Jan. 24, 2023, by Chen Tessler, et al., entitled "LEARNING DIRECTABLE VIRTUAL AGENTS THROUGH CONDITIONAL ADVERSARIAL TRAINING," commonly assigned with this application and incorporated herein by reference in its entirety.

TECHNICAL FIELD

This application is directed, in general, to virtual agent motion learning and, more specifically, to learning new motions using reference motions of the virtual agent.

BACKGROUND

Virtual environments and interactive characters have become more prevalent and user-friendly, but creating realistic and diverse behaviors for these virtual agents remains a challenge due to the complexity of human motion. To create interactive and immersive experiences, virtual agents must be able to adapt to different environments and user inputs in a life-like manner, which requires the ability to perform a wide range of behaviors on demand. To make this possible, control models that can generate complex and realistic behaviors can be used, while taking into account the properties of the environment. For example, in virtual reality games, players expect virtual characters and objects to behave realistically when interacting with them. This includes responding to user commands and navigating through virtual environments. If virtual agents do not respond naturally to user input, it can disrupt the immersive experience.

SUMMARY

In one aspect, a method to determine results to be applied to joints of an agent is disclosed. In one embodiment, the method includes (1) receiving input parameters that include environment parameters, a set of reference motions, and a state of or constraints for the agent, wherein the agent is capable of being visually rendered, (2) receiving a requested movement, wherein the requested movement does not exist in the set of reference motions and the requested movement occurs over more than one time-step in a time-step series, (3) selecting a sub-set of reference motions from the set of reference motions, wherein the sub-set of reference motions are used to produce instructions for the requested movement, (4) determining a latent to be used by a low-level policy using the input parameters, the requested movement, the sub-set of reference motions, and an encoder, wherein the encoder is updated utilizing the sub-set of reference motions, and (5) updating the low-level policy by applying a conditional discriminator to the latent and generating the results that include the updated low-level policy, the updated encoder, and the instructions, wherein the conditional discriminator utilizes feedback of the latent and the results specify a joint movement of the agent and a vector force applied to each of the joints of the agent.

In a second aspect, a system is disclosed. In one embodiment, the system, includes (1) a receiver, operational to receive input parameters that include a set of reference motions, a state of an agent, constraints for the agent, and a requested movement, wherein the agent is capable of being visually rendered, and (2) one or more processors, operational to select a sub-set of reference motions from the set of reference motions, modify an encoder or a low-level policy using the sub-set of reference motions and the requested movement, utilize a conditional discriminator to apply feedback to movement of the agent within the encoder or the low-level policy, and produce results, wherein the sub-set of reference motions are a best fit to the requested movement, and the results include instructions over a time-step series for joint movement of the agent to accomplish the requested movement.

In a third aspect, a computer program product having a series of operating instructions stored on a non-transitory computer-readable medium that directs a data processing apparatus when executed thereby to perform operations to modify an encoder or a low-level policy for providing instructions for movement for joints of an agent capable of being visually rendered is disclosed. In one embodiment, the operations include (1) receiving input parameters that include environment parameters, a set of reference motions, and a state of or constraints for the agent, wherein the agent is capable of being visually rendered, (2) receiving a requested movement, wherein the requested movement does not exist in the set of reference motions and the requested movement occurs over more than one time-step in a time-step series, (3) selecting a sub-set of reference motions from the set of reference motions, wherein the sub-set of reference motions are used to produce instructions for the requested movement, (4) determining a latent to be used by the low-level policy using the input parameters, the requested movement, the sub-set of reference motions, and the encoder, wherein the encoder is updated utilizing the sub-set of reference motions, and (5) updating the low-level policy by applying a conditional discriminator to the latent and generating the results that include the updated low-level policy, the updated encoder, and the instructions, wherein the conditional discriminator utilizes feedback of the latent and the results specify a joint movement of the agent and a vector force applied to each of the joints of the agent.

BRIEF DESCRIPTION

Reference is now made to the following descriptions taken in conjunction with the accompanying drawings, in which.

DETAILED DESCRIPTION

Virtual agents and virtual worlds have become more popular in recent years because they allow users to interact with realistic and engaging digital environments and characters. One challenge in creating these virtual worlds is generating diverse and meaningful behaviors for the virtual agents that inhabit them, especially when it comes to adapting to changing environments and user input.

Recent advancements in machine learning and access to high-quality, unlabeled human motion capture data have led to the development of control policies that can closely imitate human behavior. Building on these achievements, the present disclosure presents a conditional adversarial training (CAT) process, which can also be referred to as a conditional adversarial latent model (CALM). CALM is a method to learn a representation of human movement that can capture the complexity and diversity of human motion while providing a directable interface for controlling movements of an agent. Given raw motion capture recordings, CALM can encode the recordings into a latent representation. CALM can further decode a given latent vector into a skill for a physically simulated character, enabling it to perform high-level tasks while being conditioned on a desired motion.

CALM can use a reference motion to generate a new motion having similar distributional characteristics to create a new reference motion that maintains natural-looking movement. CALM is a scalable, data-driven approach for creating directable controllers for physics-constrained virtual characters. These characters can be controlled in a similar way to how a user currently controls a virtual character in a game, e.g., by providing sequential instructions for the movement and actions of the virtual agent (i.e., agent or character) representing the character, animal, or object.

CALM can combine a motion encoder with a CALM process to reconstruct key characteristics of a given motion, while not simply copying an original motion clip from a set of reference motions. A low-level policy, e.g., a low-level controller, may not need to precisely replicate the original reference motion. The low-level policy can have the flexibility to produce diverse movements, as long as the movements resemble the distributional characteristics of the particular motion clip. This process can enable the low-level policy to diversify and deviate from the motion data to create new behaviors that may not be depicted in the original set of reference motions.

The disclosed processes implementing CALM, in learning representations of motions that capture global semantic structures, can result in similar motions being located close to each other in the latent space. Interpolation between latent variables can yield semantically meaningful transitions, such as transitioning from running to crouch running, crouch walking, or to a crouch idle state. The skill embedding, modeled by a low-level control policy, can allow agents to generate realistic motion sequences on demand.

In some aspects, when performing high-level training, the processes can enable learning a style constrained by a high-level policy, one that performs the task and uses a desired motion (e.g., hierarchical reinforcement learning). For example, the high-level policy can select a latent vector $z_t$ from the set of $Z$ at each decision point. The latent vector can then be provided to the low-level policy which produces the low-level commands to control the agent and generate the requested movement. The high-level policy can learn to combine primitive movements into complex multi-step solutions.

In some aspects, the processes can leverage the direct ability of the high-level policy, making tasks more intuitive to solve through logic (e.g., a finite state machine (FSM)) rather than using more complex reward algorithms.

The pre-training tasks and the downstream tasks can be modeled as reinforcement learning problems, where an agent can interact with an environment according to a policy $\pi$. At each time-step t in the time-step series, the agent can observe a state st and can sample an action at from the policy at~$\pi$(at|s). The environment can then transition to the next state st+1 using the transition probability (st+1| st, at). The goal in both tasks can be to maximize the discounted cumulative reward, as defined in Equation 1.

Example of maximizing the discounted cumulative reward  Equation 1

$$J = \mathbb{E}^\pi_{s\sim\mu}\left[\sum_{t=0}^{\infty}\gamma^t r_t | s_0 = s\right]$$

where μ is the initial state distribution, and

γ is an element in the range [0,1) and is the discount factor to determine whether the agent is short-sighted (e.g., closer to 0) or considers longer-term outcomes (e.g., closer to 1).

Learning a rich reusable skill representation allows for generating a wide range of motions on demand, opening a range of potential applications, such as games. CALM can learn a motion-conditioned policy $\pi$(a|s, z), where motions M are represented by a latent variable z∈ $Z$ . These representations can be learned using a motion encoder z=(M). To achieve this task, CALM can solve a conditional imitation learning objective over motions M sampled uniformly from a reference dataset $\mathcal{M}$ . Equation 2 demonstrates a conditional imitation learning objective.

Example conditional imitation learning objective  Equation 2

$$\max_\pi - E_{M\in\mathcal{M}}D_{JS}\big(d^\pi(s, \hat{s}|M)\|d^M(\hat{s}, \hat{s}')\big)$$

where $D_{JS}$ is the Jenson-Shannon divergence, $d^\pi(s, \hat{s}|M)$ is the policy distribution, and $d^\pi(s, \hat{s}|M)$ is the reference motion stationary distribution.

CALM can mitigate issues that occur with conventional solutions where the mode can collapse when faced with an increased range of motions. CALM utilizes a conditional discriminator that can help mitigate mode collapse so that the low-level policy can generate a diverse set of motions. The process does not guarantee that all possible motions are generated. At each iteration, a random motion M can be sampled from the reference dataset. The encoder produces the respective encoding z=(M). The low-level policy and the conditional discriminator can then be conditioned on this latent z. This conditioning can provide the discriminator the ability to prevent mode collapse, and enable directability for the policy. The discriminative loss can be represented by Equation 3 and the low-level policy objective can be represented by Equation 4.

Example discriminative loss relationship    Equation 3

$$\mathcal{L}_D = -\mathbb{E}_{z=E(M); M \in \mathcal{M}}\big[\mathbb{E}_{d^M_{\hat{s},\hat{s}'}}(\log \mathcal{D}(\hat{s}, \hat{s}'|z)) +$$
$$\mathbb{E}_{d^\pi(z)_{\hat{s},\hat{s}'}}(\log(1 - \mathcal{D}(\hat{s}, \hat{s}'|z)))\big]$$

Example low-level policy objective    Equation 4

$$J = \mathbb{E}_{z=E(M); M \in \mathcal{M}}\left[\mathbb{E}^{\pi(z)}_{(\hat{s},\hat{s}')\sim\mu}\left(\sum_t \gamma^t - \log(1 - \mathcal{D}(\hat{s}, \hat{s}'|z))\right)\right]$$

Using an encoder for motion conditioning can create an information bottleneck. By removing the temporal dimension, the encoder can be encouraged to produce a latent space that encodes the essence of motions. This can allow for the emergence of novel behaviors through interpolation in the motion manifold. A representation of the motion can be one that is optimized for the control policy, rather than relying on auxiliary objectives to drive the structure of the latent representation, as is done in existing solutions. Therefore, the disclosed processes can train the encoder end-to-end using gradients from the low-level policy when optimizing the pre-training objective (see, for example, Equation 4).

The encoder can be trained with a unit $l_2$ norm projection on the output, which restricts the output space to the unit hypersphere. Fixed-norm vectors are known to improve training stability in machine learning, where dot products are commonly used. In some aspects, well-clustered features can be linearly separated from the rest of the feature space. In the context of motion generation, the structure imposed on the latent space by the unit $l_2$ norm constraint can reduce the likelihood of unnatural behaviors arising from sampling out-of-distribution latents during inference.

As reference motion clips can be arbitrarily long, the disclosed processes can split the reference motion clips into overlapping (e.g., sliding window) sub-motions of two seconds. Other values can be used as well, such as one second, 1.5 seconds, 3.0 seconds, or other time windows. The sub-motion clip should be long enough to present unique and diverse characteristics while not being too long such that they can still represent motions with a finite number of traits.

Agents need to sequentially transition between different behaviors. Even in simple tasks, such as reaching a goal location, the character could utilize a combination of sub-movements such as walking, turning, and standing idle. In some aspects, to improve the smooth and visually appealing transitions between motions, the agent can be directed to change the desired latent variable z during training. Specifically, z can be randomly changed at random time-steps in the time-step series to condition the agent on different behaviors. This can improve the agent in learning to transition between behaviors. The random change in z can be toward one of various types of requested movements of the agent. The random change in time-step sampling can be any range of time, for example, 5 milliseconds to 10 seconds, or other value ranges.

The discriminator can be trained using a defined objective. Given a motion M from the dataset $\mathcal{M}$, an encoder q is first used to map the motion sequence to a latent embedding z. The discriminator can be conditioned on this embedding, and trained to differentiate between state transitions from the original encoded motion clip, and state transitions generated by the low-level policy. Similarly, the low-level policy can be conditioned on this embedding, and can be trained to produce motions that resemble the original reference motion clip by fooling the discriminator.

In some aspects, a gradient penalty regularizer can be incorporated, which can mitigate overfitting for the discriminator and help to provide a smoother optimization landscape for the low-level policy. This can help improve training stability and the overall quality of the generated motion. To prevent the discriminator from shaping the low-level policy's representation, the gradient can be stopped from flowing into the encoder from the discriminator objective by setting z=stop grad(E(M)). Equation 5 demonstrates a discriminator training objective.

Example objective for training the discriminator    Equation 5

$$\mathcal{L}_D = -\mathbb{E}_{z=E(M); M \in \mathcal{M}}\big[\mathbb{E}_{d^M_{\hat{s},\hat{s}'}}(\log \mathcal{D}(\hat{s}, \hat{s}'|z)) +$$
$$\mathbb{E}_{d^\pi(\hat{s},\hat{s}'|z)}[\log(1 - \mathcal{D}(\hat{s}, \hat{s}'|z))]\big] + w_{gp}\mathbb{E}_{d^M_{\hat{s},\hat{s}'}}\big[\|\nabla_\theta \mathcal{D}(\theta)|_{\theta=(\hat{s},\hat{s}'|z)}\|^2\big]$$

The framework can utilize a high-level policy to select macro actions (e.g., behaviors employed for multiple time-steps), and the low-level policy as described above which can generate the movements (e.g., skills) that can be used to generate the macro actions. The low-level policy can be derived from the pre-training phase, while the high-level policy can be generated for the specific task or movement requested. By using the low-level policy as a skill generator, the high-level policy can select and execute behaviors sequentially to achieve the desired movement. The high-level policy can be represented by two different forms of high-level policies for guiding the movements of the agent.

In some aspects, the high-level policy can be to be trained to control the low-level policy by optimizing a task reward in a prespecified style (e.g., macro movement parameter). This form can resolve an issue where the low-level policy may provide the movement for a 'run' movement request without knowing a direction in which to 'run'. The high-level policy can provide a macro movement action of 'run' that includes a direction. The directability of CALM can enable controlling the style in which the movement is directed. For example, the agent can be tasked with moving in a specified direction while crouch-walking, or sprinting. Given a motion encoding 2, the reward can be defined as shown in Equation 6.

Example reward determination    Equation 6

$$r_t^{task\ ins\ tyle} = r_t^{task} + \exp(-\|z_t - \hat{z}\|_2^2)$$

In some aspects, the high-level policy can be trained to control the low-level policy by using an FSM (e.g., specifying a macro movement parameter). The directability of the low-level policy can enable the requested movement to describe how the movement should be solved, overcoming the fragility of the reward design. Here, the requested movement, as determined by a goal designer or other type of user, or a movement processor or movement system, can provide demonstration movements for the various motions the agent should perform as captured (e.g., stored) in an FSM. The motions stored within an FSM can be used to determine when to transition from one type of movement to the next type of movement. For example, the requested movement of striking an object can be broken down into sub-tasks "run towards the object" until you are within 0.5 meters distance, then "perform an attack", then "stand idle" and await the next command.

Achieving this level of control utilizes a combination of versatility, provided by the low-level policy, and precision, provided by a pre-trained reward-guided high-level policy. In some aspects, such as for requested movements requiring accuracy, e.g., moving in a specified direction, the FSM can provide the high level-policy with a requested motion embedding ẑ and a direction in which this motion should be performed. In some aspects, such as when transitioning to isolated motions, e.g., performing a kick or a specific sword swipe, the FSM can provide the motion encoding directly to the low-level policy. In some aspects, the FSM can be utilized without task-specific high-level policy training.

Employing a reward-type high-level policy or an FSM-type high-level policy can enable re-usability without re-training. A single combination of (a) pre-trained low-level policy. (b) encoder, and (c) high-level policy, can be utilized to solve multiple tasks in varying forms. For example, reaching a target while running or crouch-walking, and then striking it with the sword or shield.

CALM can be used for defining movement for various framerates, such as 30 Hertz (Hz), 60 Hz, 120 Hz, or other target refresh rates. The latent space can be defined as a multi-dimensional hypersphere, for example, a 64-dimensional hypersphere. The encoder can be a standard multi-layer perceptron (MLP), where $E(M) \rightarrow z$. The low-level policy generator and discriminator can each contain an additional input head $H(z)$ for latent parsing, followed by an MLP $\pi(s, H(z)) \rightarrow a$.

Conventional processes learns skill representation as an auxiliary loss, such that the latent space lacks the proper semantic structure to enable agents to learn control. Using a mutual information term in the reward can lead to generating diverse behaviors, where the learned latent space lacks semantic meaning and can lead to mode collapse. The disclosed processes do not learn via a mutual information term, rather CALM learns directly as part of the policy learning procedure. This can improve the learned latent representation optimization for downstream tasks.

Some conventional processes use a labeled dataset of pairs (text and motion sequence) and uses contrastive learning to learn a latent representation of skills. They can use a weighting between language and kinematic reconstruction, e.g., using a state prediction as opposed to a goal. The disclosed processes learns a skill representation via a policy optimization. This enables the representation to be optimized for solving downstream tasks without manual engineering.

Figure 1:
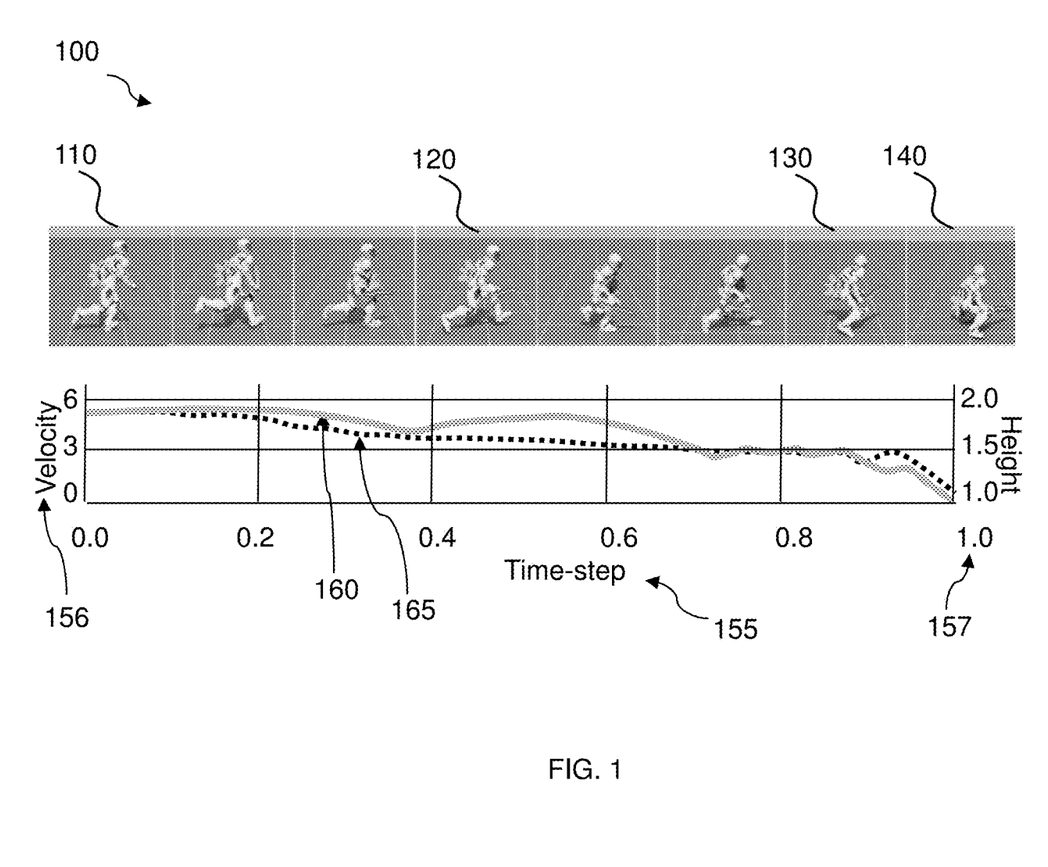
FIG. 1 is an illustration of a diagram of an example complex motion of an agent.

Turning now to the figures, FIG. 1 is an illustration of a diagram of an example complex motion 100 of an agent. Complex motion 100 demonstrates that using CALM, a set of movements can be generated that resemble the distributional characteristics of a provided motion from the reference movements. To create these motions, the encoder receives a motion clip M and the low-level policy is conditioned using the resulting latent encoding $z=E(M)$. Two motions, 'sprint' and 'crouching idle' are the requested movements. Their respective latent representations are obtained.

CALM then interpolates between the two retrieved reference motions (e.g., the sub-set of reference motions) while staying on the surface of the unit hypersphere. At each time-step, the resulting latent $z_t$=norm $(T+t)z_1+tz_2)$. A time-step can be various lengths of time, such as 5 milliseconds, 10 seconds, or other values. Complex motion 100 shows a smooth transition between the two requested movements, decreasing speed and agent height while continuously performing a form of walking motion. The agent transitions from sprinting to running while crouching, to walking while crouching, and finally to an idle crouching position.

Complex motion 100 shows an agent running at the start of the time-step series in an agent representation 110. In an agent representation 120, the agent is still moving forward and beginning to crouch down. In an agent representation 130, the agent's forward movement is nearly stopped and the crouch is a little deeper. In an agent representation 140, the agent is fully stopped and in the proper crouch position. Below the agent representations is a corresponding velocity and height chart showing the agent's velocity and height at each time-step.

The chart has an x-axis 155 showing the time-step in seconds. A y-axis-1 156 shows the velocity of the agent at the time-step in meters per second. A y-axis-2 157 shows the height of the agent in meters. Line 160 shows the velocity of the agent slowing down over the time-step series as the agent's running comes to an idle. Line 165 shows the height of the agent lowering at approximately the same time as the velocity of the agent, though the change in height does vary as to the velocity.

Figure 2:
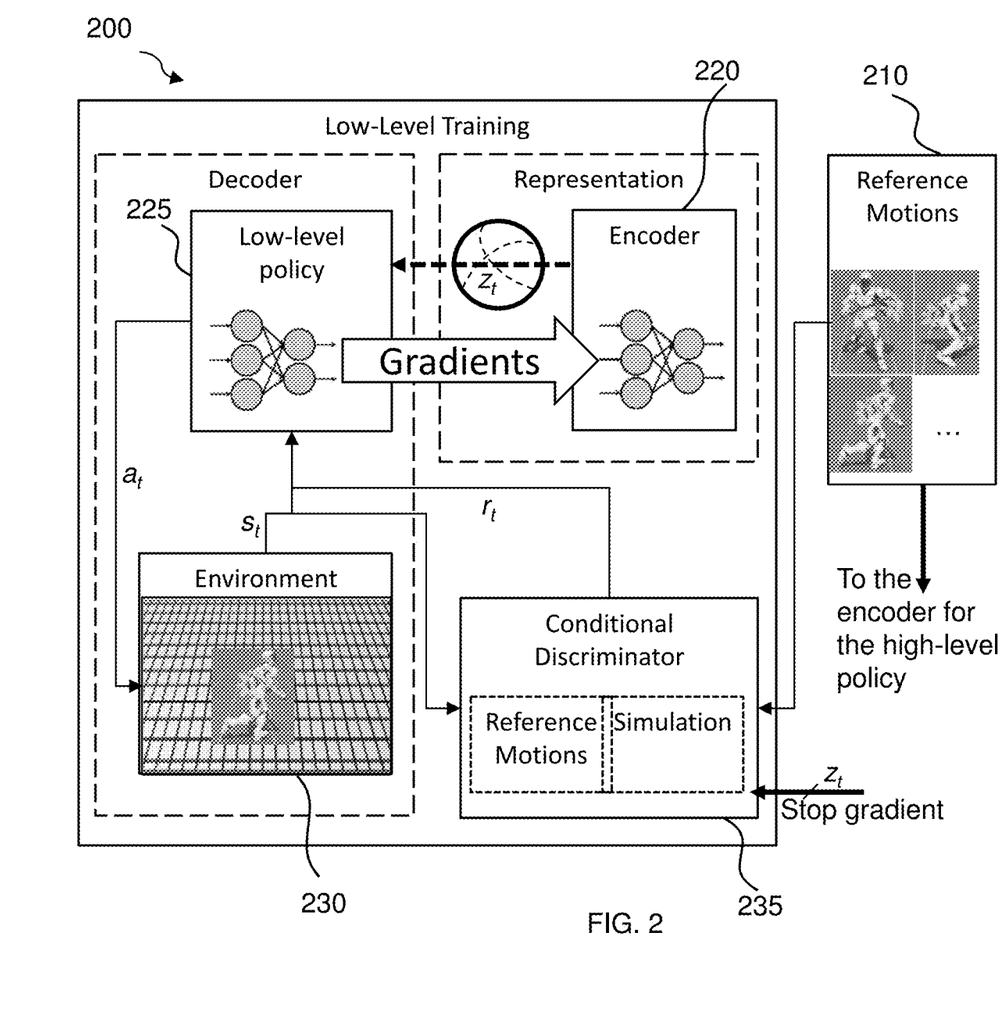
FIG. 2 is an illustration of a diagram of an example functional view of low-level training.

FIG. 2 is an illustration of a diagram of an example functional view of low-level training 200. During low-level training, CALM can learn an encoder E that maps motions from a reference dataset $M \in \mathcal{M}$ to a low-dimensional latent representation $z \in \mathcal{Z}$. In some aspects, CALM can jointly learn a low-level policy $\pi(a|s, z)$ that generates motions similar to the reference dataset. This low-level policy can produce a variety of behaviors on demand. In some scenarios, achieving low-level control can be challenging. For example, while the encoder can be coded to provide an instruction to walk, controlling the direction of movement can remain difficult.

In some aspects, in the initial training phase, the encoder and low-level policy can be developed by utilizing feedback from a conditional discriminator. The encoder can learn to create a condensed representation that encapsulates the core of the motion, while the low-level policy, which interacts with the environment, serves as a decoder.

An encoder 220 can be employed, such as an MLP. The encoder can take in a sub-set of reference motions $M_t$, which can be drawn from a set of reference motions $\mathcal{M}$ 210, where each reference motion in the sub-set of reference motions closely represent part of the requested movement. The encoder can map this motion onto a low-dimensional latent space $z_t$ in $\mathcal{Z}$, where the temporal dimension can be removed.

A low-level policy 225 can produce a series of movements for the agent, for example, a series of motor actuations for one or more joints of the agent, using a latent variable $z_t$. Low-level policy 225 has a goal to generate motion that exhibits similar characteristics as the original reference movement $\mathcal{M}_t$. Low-level policy 225 can utilize parameters from environment 230 to provide information on the hypersphere used to determine the low-level policy.

A discriminator 235 can be a conditional discriminator. Discriminator 235 can provide feedback to low-level policy 225. Low-level policy 225 can then have an objective to generate state transitions, such as $[s_t, s_{t+1}]$, that belong to the same class as the motion $\mathcal{M}_t$. The goal can be to produce a stationary distribution over the states $d(s, s'|M_t)$ that is similar to that of the data $dM_t(m,m')$. In some aspects, discriminator 235 can employ a stop gradient for $z_t$ to provide a spatial constraint on the movements.

Once the pre-training has completed, encoder 220 or low-level policy 225 can be used for generating movement instructions for an agent. Instructions for an agent can be represented, for example, by how much force to apply to a joint and in which direction to apply the force (e.g., vector force). This type of representation can be utilized, for example, when the joints are represented by a point cloud in the hypersphere. The point cloud representation can also be utilized by encoder 220 or low-level policy 225 to determine the instructions by comparing different movement instructions and the effect on the neighboring points of the joint point cloud.

In some aspects, encoder 220 can be used without low-level policy 225 to classify new behaviors, for example, by performing k-nearest neighbor (KNN) classification on the latent representations with respect to prior, known, skills. In some aspects, low-level policy 225 can be used without encoder 220 to solve requested movements. For example, a hierarchical controller can be trained to output latent vectors. The latent vectors can control the requested movement, which the pre-trained policy can produce. In some aspects, encoder 220 can be used with low-level policy 225, such as when encoder 220 is utilized to map motions to their respective latent representations. These representations can then be used to control low-level policy 225 which was pre-trained.

Figure 3:
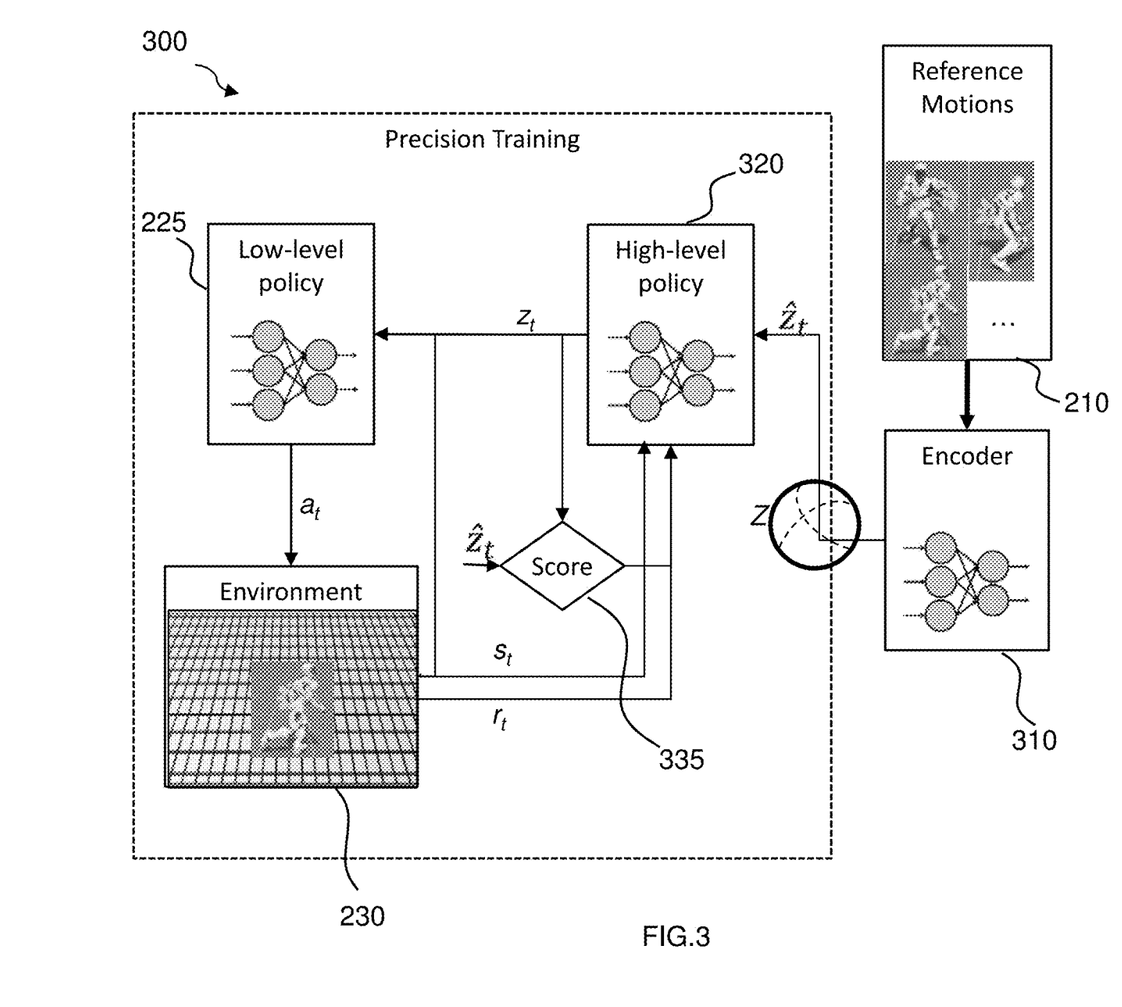
FIG. 3 is an illustration of a diagram of an example functional view of precision training.

FIG. 3 is an illustration of a diagram of an example functional view of precision training 300. In precision training 300, a high-level reward-driven policy can be trained. Once the pre-training phase has concluded, the encoder and low-level policy can be frozen. The next step is precision training. Here, a high-level policy can be trained to control (for example, constrain to an environment, a direction, or other macro movement) the low-level policy. In this stage, the motion encoder can be used to constrain the solutions so that they are close to pre-specified movements, thus guiding the high-level policy. The process focuses on complementing the low-level policy and providing enhanced low-level precision, such as guiding an agent's movement in a specific direction.

Precision training 300 includes reference motions $\mathcal{M}$ 210 providing reference movement to an encoder 310. Encoder 310 communicates with a high-level policy 320 which provides guidance or constraints on low-level policy 225. In aspects where a reward algorithm is utilized, a reward score 335 can be used to determine the reward parameter for one or more movements, and the movement with the highest reward for the environment provided by environment 230 can be selected by high-level policy 320.

Figure 4:
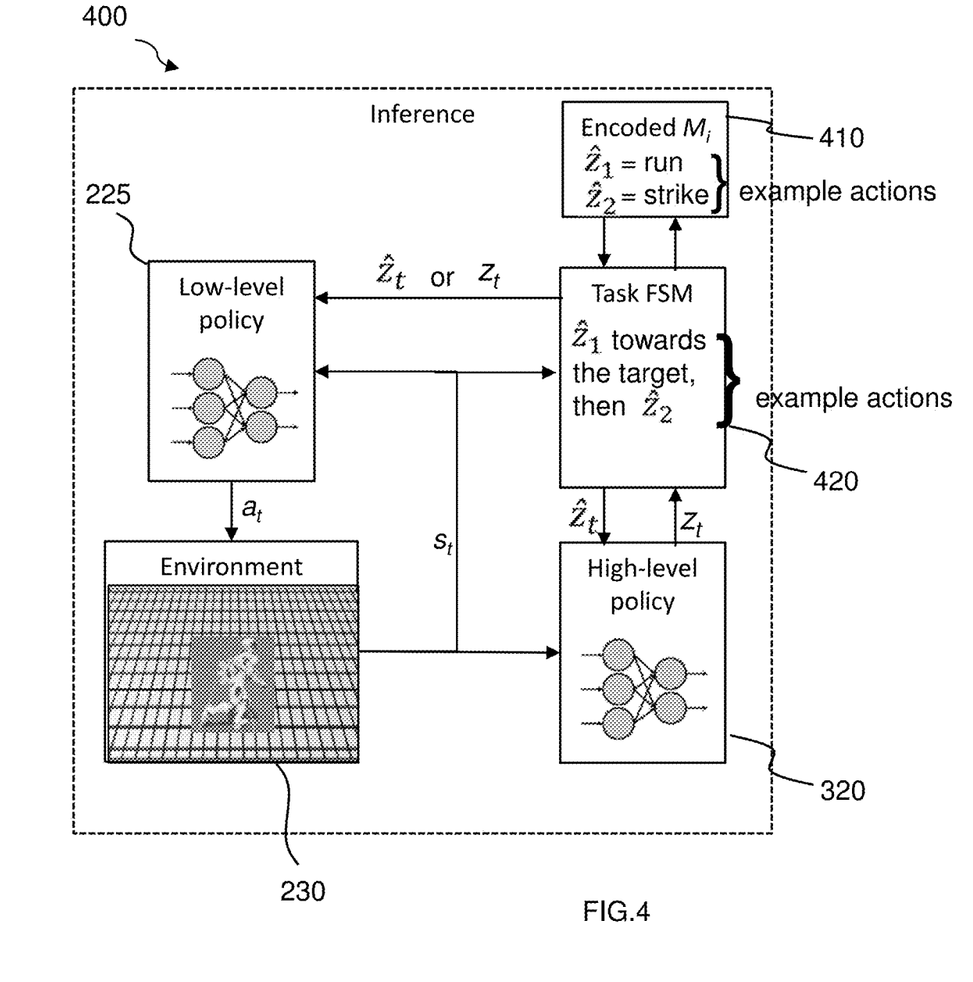
FIG. 4 is an illustration of a diagram of an example functional view of inference usage.

FIG. 4 is an illustration of a diagram of an example functional view of inference usage 400, which can allow complex tasks to be solved without additional training. Inference usage 400 can describe solutions to tasks using motions. An FSM containing standard rules and commands determines which motion to perform and whether this is a simple motion performed directly using the low-level policy, or a directed motion requiring high-level control. During inference the FSM can contain a set of rules that depend on the state of the task. Each rule can be a tuple of (who, what). The who refers to a low-level or a high-level policy. The what can be the latent representation z of the requested motion, and for the high-level policy it can also contain the task-specific information. The FSM can directly control the low-level policy by providing it with the requested latent z. Alternatively, the FSM can provide the high-level policy with a latent z and a guidance command (the relevant task information), in which case the high-level policy can pass the appropriate latent z' to the low-level policy to control the character.

As an example, a target may be struck by constructing an FSM in the following manner: "high-level: crouch-walk towards the target, until distance<1 m; low-level: kick; low-level: crouch-idle". In the last phase, inference usage 400 (e.g., an inference process), the high-level policy can be frozen. Solutions to complex tasks are then described using FSM (e.g., rule-based systems that do not require training) rather than using rewards. Utilizing the state of the task, the FSM can provide a command to the high-level policy or can provide a latent movement directly to the low-level policy.

In a second example, the agent needs to reach a location and then remain idle at that spot. The high-level policy has been trained to move in a specified direction. While the agent has not arrived at the goal location: the FSM can provide the high-level policy with $z_1$ which represents the motion "run", and a vector pointing in the current direction of the goal location. The high-level policy receives $z_1$ and the task, and produces latent variables $z_t$ that produce motion with similar characteristics to $z_1$ that move in the specified direction. These $z_t$ are provided to the low-level policy that generates actions $a_t$, that move the character. Once within close proximity, the FSM can provide the low-level policy with $z_2$ which represents the motion "stand idle". This can directly control the low-level policy, bypassing the high-level policy.

In some aspects, inference usage 400 can be employed during a training time, such as at a time when low-level training 200 or precision training 300 is being utilized. In some aspects, inference usage 400 can be employed at a time when the agent is being actively rendered visually, for example, during gameplay. In this aspect, inference usage 400 can be incorporated in real-time or near real-time to the visual rendering of the agent.

Inference usage 400 includes an encoder 410 and an FSM 420. FSM 420 can be used to determine movements, such as after a rewards process has been performed and the highest reward movements have been selected for a movement request, those selected movements can be encapsulated in FSM 420 for use by the rendering engine. Encoder 410 can be used to determine whether a rewards movement or an FSM movement would be best for a requested movement utilizing environment 230, low-level policy 225, and high-level policy 320.

Figure 5:
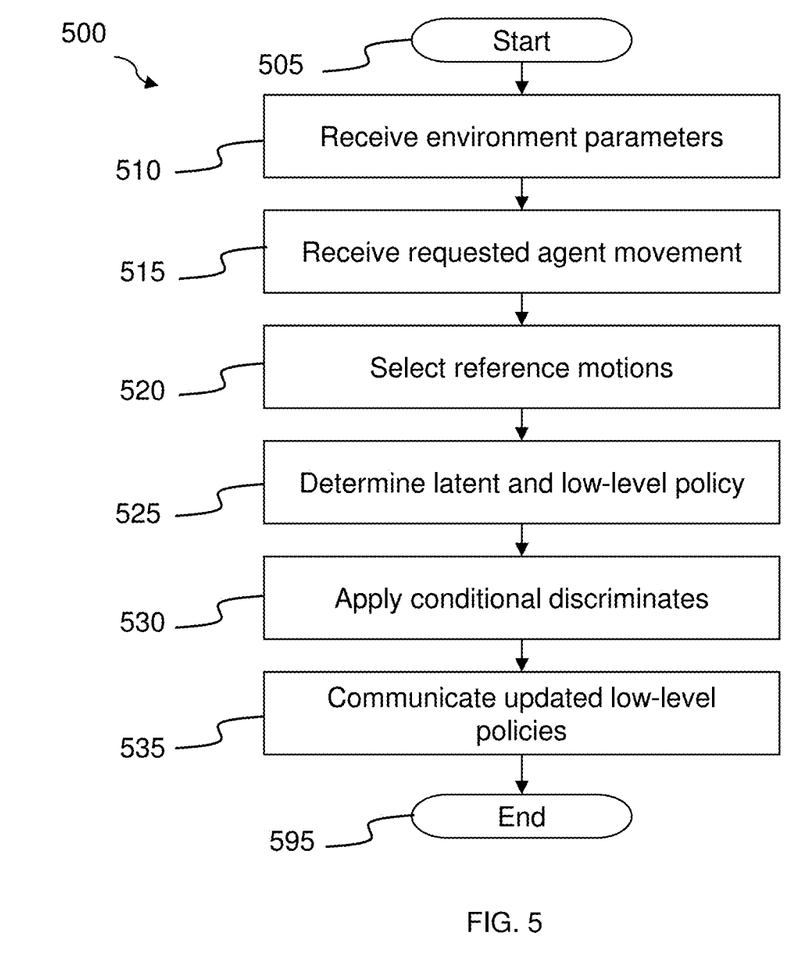
FIG. 5 is an illustration of a flow diagram of an example method of using a conditional adversarial latent model (CALM)

FIG. 5 is an illustration of a flow diagram of an example method of using CALM. Method 500 can be performed on a computing system, for example, CALM system 600 of FIG. 6 or CALM controller 700 of FIG. 7. The computing system can be a movement controller, one or more processors (e.g., central processing units, graphics processing units, or other types of processors), a data center, a cloud environment, a server, a laptop, a mobile device, a smartphone, a PDA, or other computing system capable of receiving the reference movements, input parameters, and capable of communicating with other computing systems. Method 500 can be encapsulated in software code or in hardware, for example, an application, code library, dynamic link library, module, function, RAM, ROM, and other software and hardware implementations. The software can be stored in a file, database, or other computing system storage mechanism. Method 500 can be partially implemented in software and partially in hardware. Method 500 can perform the steps for the described processes, for example, learning or generating a low-level policy, high-level policy, discriminator, or encoder.

Method 500 starts at a step 505 and proceeds to a step 510. In step 510, the input parameters can be received. The input parameters can be the environment parameters, the agent parameters (for example, the agent's joint positions and velocities), the set of reference motions, and other input parameters. In a step 515, the requested agent movement can be received. For example, the requested movement can be for the agent to run forward while crouching down and then stop.

In a step 520, the reference motions that can be used to produce the requested movement can be selected as a set of reference motions. For example, a running motion and a crouching motion can be selected.

In a step 525, a latent can be determined using an encoder, a hypersphere, and environment parameters. The low-level policy can act on the provided latent variable and observed state of the character. The latent can be projected onto the unit hypersphere and a determination of joint movements for the latent can be ascertained using the encoder and low-level policy.

In a step 530, the low-level policy can be modified or updated using a conditional discriminator to provide feedback on the joint movements available to the latent. The feedback can be used by the low-level policy to determine whether the generated motion is similar to the reference motion, thereby providing a learning signal. In some aspects, the conditional discriminator can receive an input that controls certain gradients from flowing into the conditional discriminator. For example, a user can specify to stop certain gradients from flowing.

In some aspects, step 530 can include a high-level policy learning process. The high-level policy can provide input to the low-level policy, further modifying the low-level policy with macro-level instructions, such as including a direction to the movement. In some aspects, the high-level policy can utilize a reward algorithm for determining movement characteristics. In some aspects, the high-level policy can utilize an FSM algorithm for determining movement characteristics.

In a step 535, the updated encoder and low-level policy, having learned the requested movement, can be communicated, such as to a data store, the reference motion storage, a game controller, a rendering processor, or other process, system, or computing system. Method 500 ends at a step 595.

Figure 6:
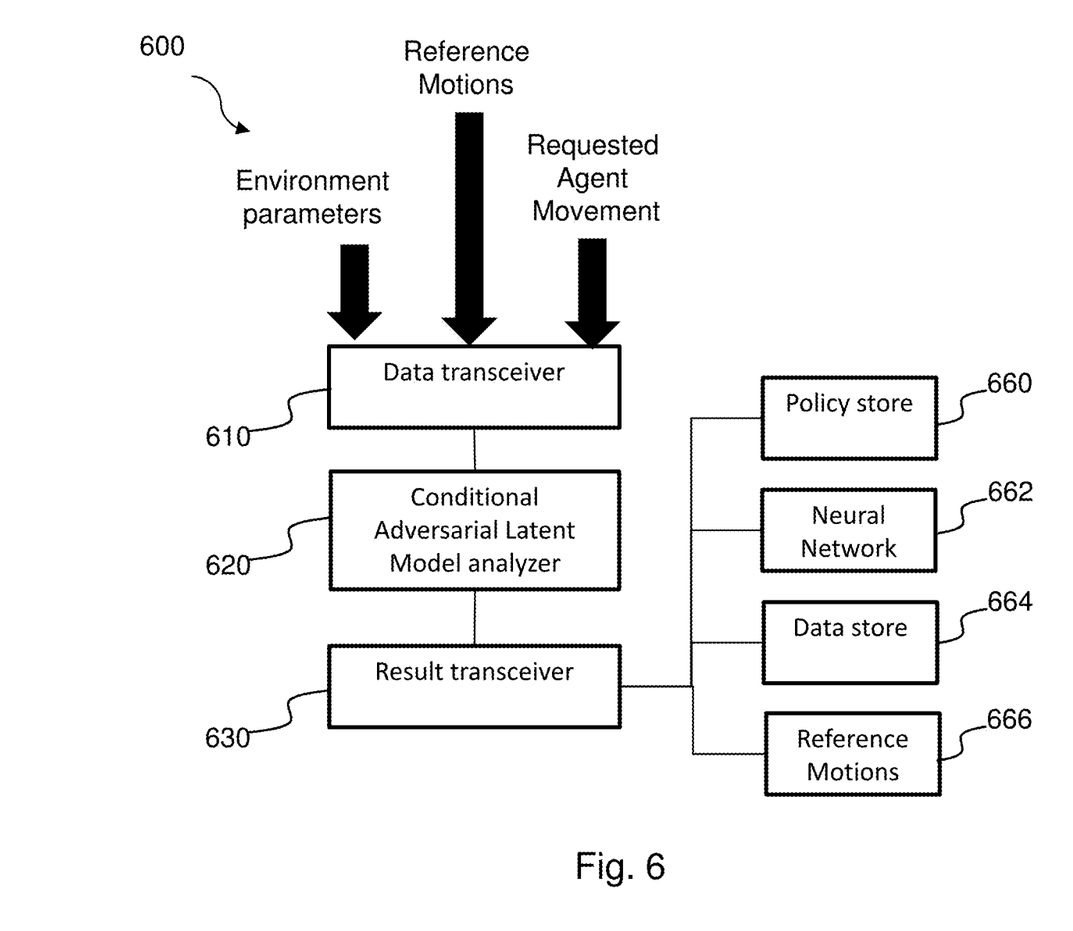
FIG. 6 is an illustration of a block diagram of an example CALM system.

FIG. 6 is an illustration of a block diagram of an example CALM system 600, which can be implemented in one or more computing systems or one or more processors, for example, an agent control system, a gaming processor, a gaming controller, a graphics processing unit, a data center, a cloud environment, a server, a laptop, a smartphone, a tablet, and other types of computing systems. In some aspects, CALM system 600 can be implemented using a CALM controller such as CALM controller 700 of FIG. 7. CALM system 600 can implement one or more aspects of this disclosure, such as method 500 of FIG. 5.

CALM system 600, or a portion thereof, can be implemented as an application, a code library, a dynamic link library, a function, a module, other software implementation, or combinations thereof. In some aspects, CALM system 600 can be implemented in hardware, such as a ROM, a graphics processing unit, or other hardware implementation. In some aspects, CALM system 600 can be implemented partially as a software application and partially as a hardware implementation. CALM system 600 is a functional view of the disclosed processes and an implementation can combine or separate the described functions in one or more software or hardware systems. In some aspects, CALM system 600 can be implemented using a neural network or a deep learning neural network.

CALM system 600 includes a data transceiver 610, a CALM analyzer 620, and a result transceiver 630. The results, e.g., the learned encoder, low-level policy, high-level policy, analysis, and interim outputs from CALM analyzer 620, can be communicated to a data receiver, such as one or more of a user, a policy store 660 (e.g., for low and high-level policies), a neural network 662, a data store or other computing systems 664, or a reference motions 666. The results can be used to determine the motion primitives provided to a system to visually render the agent according to the requested movements of the agent at render time. The motion primitives can direct the agent across a time-step series of various lengths, where a new set of motion primitives can be provided at a subsequent time-step.

Data transceiver 610 can receive various input parameters. The input parameters can include environment parameters that describe moving objects, non-moving objects, weather conditions, and other parameters of interest that could impact the rendered movement of the agent. The input parameters can include a set of reference motions, e.g., predefined movements that can be accessed as requested movements are processed. The input parameters can include the state of the agent, such as the direction, orientation, position, velocity, and other parameters of the agent. This can include a description of the joints of the agent, their position, and velocity. The input parameters can include the constraints applied to the agent's movements. The input parameters can include the requested movement to be learned by the agent's low and high-level policies. In some aspects, data transceiver 610 can be part of CALM analyzer 620.

Result transceiver 630 can communicate one or more results, analysis, or interim outputs, to one or more data receivers, such as policy store 660, neural network 662, computing systems 664, or reference motions 666, e.g., a data store or database, or other related systems, whether located proximate result transceiver 630 or distant from result transceiver 630. Data transceiver 610, CALM analyzer 620, and result transceiver 630 can be, or can include, conventional interfaces configured for transmitting and receiving data. In some aspects, CALM analyzer 620 can be a machine learning system.

CALM analyzer 620 (e.g., one or more processors such as processor 730 of FIG. 7) can implement the analysis and algorithms as described herein utilizing the various input parameters. For example, CALM analyzer 620 can select a set of reference motions that best fit the requested movement to be learned, determine encoder parameters according to the low-level policy, update the low-level policy according to a high-level policy, and using the encoder, low-level policy, and high-level policy, determine agent movements to implement the requested movement. The agent's movements can be a description of the joint movements of the agent. In some aspects, CALM analyzer 620 can utilize a reward algorithm when analyzing the high-level policy. In some aspects, CALM analyzer 620 can utilize a FSM algorithm when analyzing the high-level policy.

A memory or data storage system of CALM analyzer 620 can be configured to store the processes and algorithms for directing the operation of CALM analyzer 620. CALM analyzer 620 can also include a processor that is configured to operate according to the analysis operations and algorithms disclosed herein, and an interface to communicate (transmit and receive) data.

Figure 7:
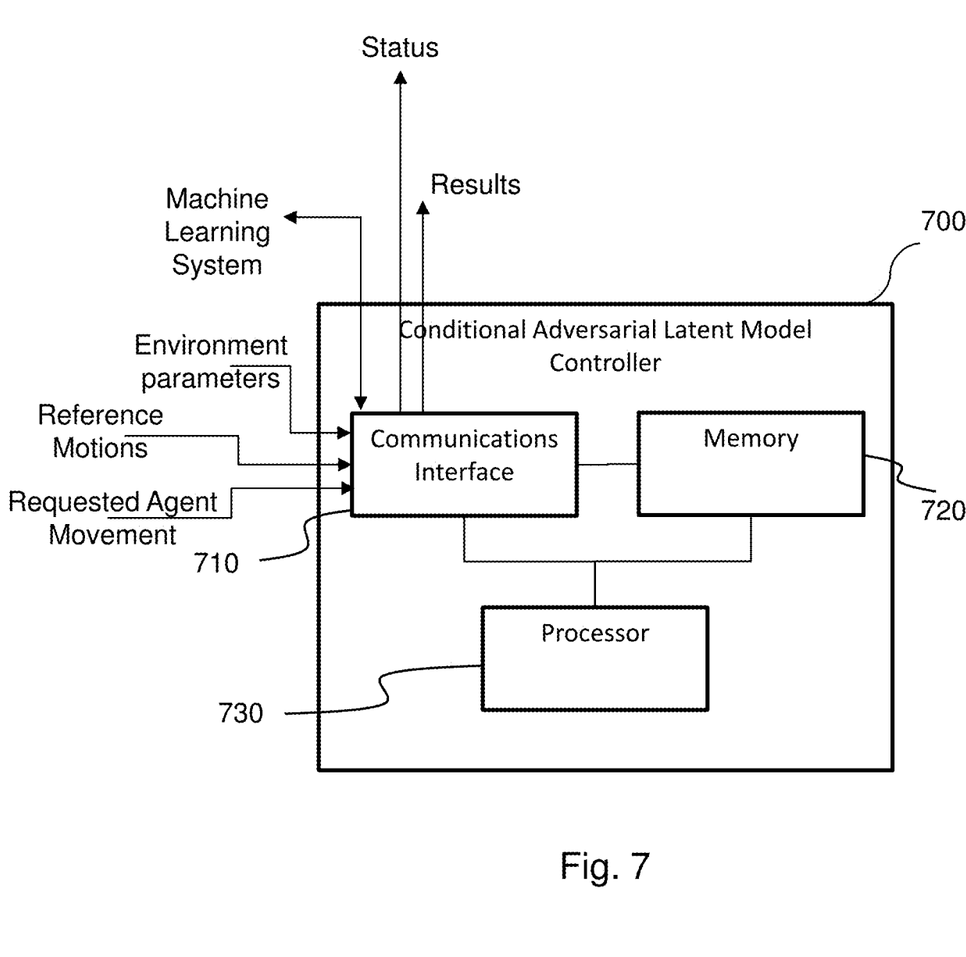
FIG. 7 is an illustration of a block diagram of an example of a CALM controller according to the principles of the disclosure.

FIG. 7 is an illustration of a block diagram of an example of a CALM controller 700 according to the principles of the disclosure. CALM controller 700 can be stored on a single computer or on multiple computers. The various components of CALM controller 700 can communicate via wireless or wired conventional connections. A portion or a whole of CALM controller 700 can be located at one or more locations. In some aspects, CALM controller 700 can be part of another system, and can be integrated in a single device, such as a part of a rendering controller, an agent processor, an agent system, a gaming control system, a robotic control system, or other system using artificial intelligence to direct a movement of a virtual movable character, animal, or object.

CALM controller 700 can be configured to perform the various functions disclosed herein including receiving input parameters and generating results from an execution of the methods and processes described herein, such as determining an encoder, a low-level policy, or a high-level policy, and other results and analysis. CALM controller 700 includes a communications interface 710, a memory 720, and a processor 730.

Communications interface 710 is configured to transmit and receive data. For example, communications interface 710 can receive the input parameters. Communications interface 710 can transmit the results or interim outputs. In some aspects, communications interface 710 can transmit a status, such as a success or failure indicator of CALM controller 700 regarding receiving the various inputs, transmitting the generated results, or producing the results.

In some aspects, communications interface 710 can receive input parameters from a machine learning system, for example, where the requested movement is processed using one or more optimizations and the machine learning system uses prior learned reference motions to improve the determination of the currently selected set of reference motions.

In some aspects, the machine learning system can be implemented by processor 730 and perform the operations as described by CALM analyzer 620. Communications interface 710 can communicate via communication systems used in the industry. For example, wireless or wired protocols can be used. Communication interface 710 is capable of performing the operations as described for data transceiver 610 and result transceiver 630 of FIG. 6.

Memory 720 can be configured to store a series of operating instructions that direct the operation of processor 730 when initiated, including the code representing the algorithms for determining the requested movement parameters. Memory 720 is a non-transitory computer readable medium. Multiple types of memory can be used for the data storage systems and memory 720 can be distributed.

Processor 730 can be one or more processors. Processor 730 can be a combination of processor types, such as a central processing unit, a graphics processing unit, or other processing types. Processor 730 can be configured to produce the results (e.g., determining the requested movement parameters, and other results), one or more interim outputs, and statuses utilizing the received inputs. Processor 730 can determine the results using parallel processing. Processor 730 can be an integrated circuit. In some aspects, processor 730, communications interface 710, memory 720, or various combinations thereof, can be an integrated circuit. Processor 730 can be configured to direct the operation of CALM controller 700. Processor 730 includes the logic to communicate with communications interface 710 and memory 720, and perform the functions described herein. Processor 730 is capable of performing or directing the operations as described by CALM analyzer 620 of FIG. 6.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured or configured to means, for example, designed, constructed, or programmed, with the necessary logic and/or features for performing a task or tasks. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method to determine results to be applied to joints of an agent, comprising:
   receiving input parameters that include environment parameters, a set of unlabeled reference motions, and a state of or constraints for the agent, wherein the agent is capable of being visually rendered;
   receiving a requested movement, wherein the requested movement does not exist in the set of unlabeled reference motions and the requested movement occurs over more than one time-step in a time-step series;
   selecting a sub-set of reference motions from the set of unlabeled reference motions, wherein the sub-set of reference motions are used to produce instructions for the requested movement;
   determining a latent to be used by a low-level policy using the input parameters, the requested movement, the sub-set of reference motions, and an encoder, wherein the encoder is updated utilizing the sub-set of reference motions; and
   updating the low-level policy by applying a conditional discriminator to the latent and generating the results that include the updated low-level policy, the updated encoder, and the instructions, wherein the conditional discriminator utilizes feedback of the latent, and the results specify a joint movement of the agent and a vector force applied to each of the joints of the agent.

2. The method as recited in claim 1, further comprising:
   communicating the low-level policy and the encoder to a rendering processor, the sub-set of reference motions, a data store, or a machine learning process.

3. The method as recited in claim 1, further comprising:
   utilizing a high-level policy to modify the low-level policy, wherein the high-level policy specifies a macro movement parameter that is applied to a latent representation of the macro movement as provided by the low-level policy prior to modification.

4. The method as recited in claim 3, wherein the high-level policy utilizes a reward algorithm to determine movement instructions to utilize to modify the low-level policy.

5. The method as recited in claim 4, wherein the high-level policy utilizes a finite state machine (FSM) algorithm to determine the movement instructions to utilize to modify the low-level policy.

6. The method as recited in claim 5, wherein the FSM specifies a requested motion embedding and a direction of the requested motion for the high-level policy.

7. The method as recited in claim 5, wherein the FSM specifies the requested movement encoding directly to the low-level policy.

8. The method as recited in claim 1, wherein the determining the low-level policy further comprises:
   utilizing a FSM to provide motion encoding to the low-level policy.

9. The method as recited in claim 1, further comprising:
   utilizing an inference process when a high-level policy is frozen, wherein the inference process modifies the low-level policy or the high-level policy by utilizing specified motions to satisfy the requested movement, and the inference process determines whether a rewards movement or a FSM movement best fits the requested movement.

10. The method as recited in claim 9, wherein the inference process further comprises:
    providing the low-level policy with a requested latent representation, wherein the requested latent representation is derived from the specified motions.

11. The method as recited in claim 9, wherein the inference process further comprises:
    providing the high-level policy with a requested latent representation and a guidance command, and wherein the high-level policy modifies the requested latent representation and communicates the modified requested latent representation to the low-level policy, and where the requested latent representation is derived from the specified motions.

12. The method as recited in claim 9, wherein the utilizing the inference process occurs at a rendering time when the agent is being visually rendered.

13. The method as recited in claim 1, wherein the encoder is trained using an output space that is restricted to a fixed norm unit hypersphere.

14. The method as recited in claim 1, wherein the set of reference motions is larger than two seconds, and the set of reference motions are divided into overlapping two second sub-motion clips.

15. The method as recited in claim 1, wherein the determining the low-level policy further comprises:
    changing a latent movement to a random latent movement at a random time-step of the time-step series.

16. The method as recited in claim 1, wherein the conditional discriminator further comprises:
    mitigating overfitting the conditional discriminator to the low-level policy by incorporating a gradient penalty regularizer.

17. A system, comprising:
    a receiver, operational to receive input parameters that include a set of unlabeled reference motions, a state of an agent, constraints for the agent, and a requested movement, wherein the agent is capable of being visually rendered; and
    one or more processors, operational to select a sub-set of reference motions from the set of unlabeled reference motions, modify an encoder or a low-level policy using the sub-set of reference motions and the requested movement, utilize a conditional discriminator to apply feedback to movement of the agent within the encoder or the low-level policy, and produce results, wherein the sub-set of reference motions are a best fit to the requested movement, and the results include instructions over a time-step series for joint movement of the agent to accomplish the requested movement.

18. The system as recited in claim 17, further comprising:
    a transceiver, operational to communicate the results to a reference motion storage, an agent processor, conditional adversarial latent model (CALM) controller, or a data storage system.

19. The system as recited in claim 17, where the one or more processors are a CALM analyzer or a CALM controller.

20. The system as recited in claim 17, where the one or more processors are one or more of a central processing unit or one or more of a graphics processing unit.

21. The system as recited in claim 17, wherein the one or more processors is further operational to utilize a machine learning system or a neural network to determine the sub-set of reference motions, or to determine the results from the low-level policy or the encoder.

22. The system as recited in claim 17, wherein the receiver and the one or more processors are part of an integrated circuit.

23. The system as recited in claim 17, wherein the system is encapsulated in a software function.

24. The system as recited in claim 17, wherein the results are communicated to a rendering processor in real-time or near real-time.

25. A computer program product having a series of operating instructions stored on a non-transitory computer-readable medium that directs a data processing apparatus when executed thereby to perform operations to modify an encoder or a low-level policy for providing instructions for movement for joints of an agent capable of being visually rendered, the operations comprising:

receiving input parameters that include environment parameters, a set of unlabeled reference motions, and a state of or constraints for the agent, wherein the agent is capable of being visually rendered;

receiving a requested movement, wherein the requested movement does not exist in the set of unlabeled reference motions and the requested movement occurs over more than one time-step in a time-step series;

selecting a sub-set of reference motions from the set of unlabeled reference motions, wherein the sub-set of reference motions are used to produce instructions for the requested movement;

determining a latent to be used by the low-level policy using the input parameters, the requested movement, the sub-set of reference motions, and the encoder, wherein the encoder is updated utilizing the sub-set of reference motions; and updating the low-level policy by applying a conditional discriminator to the latent and generating the results that include the updated low-level policy, the updated encoder, and the instructions, wherein the conditional discriminator utilizes feedback of the latent, and the results specify a joint movement of the agent and a vector force applied to each of the joints of the agent.

* * * * *